Figure 1:
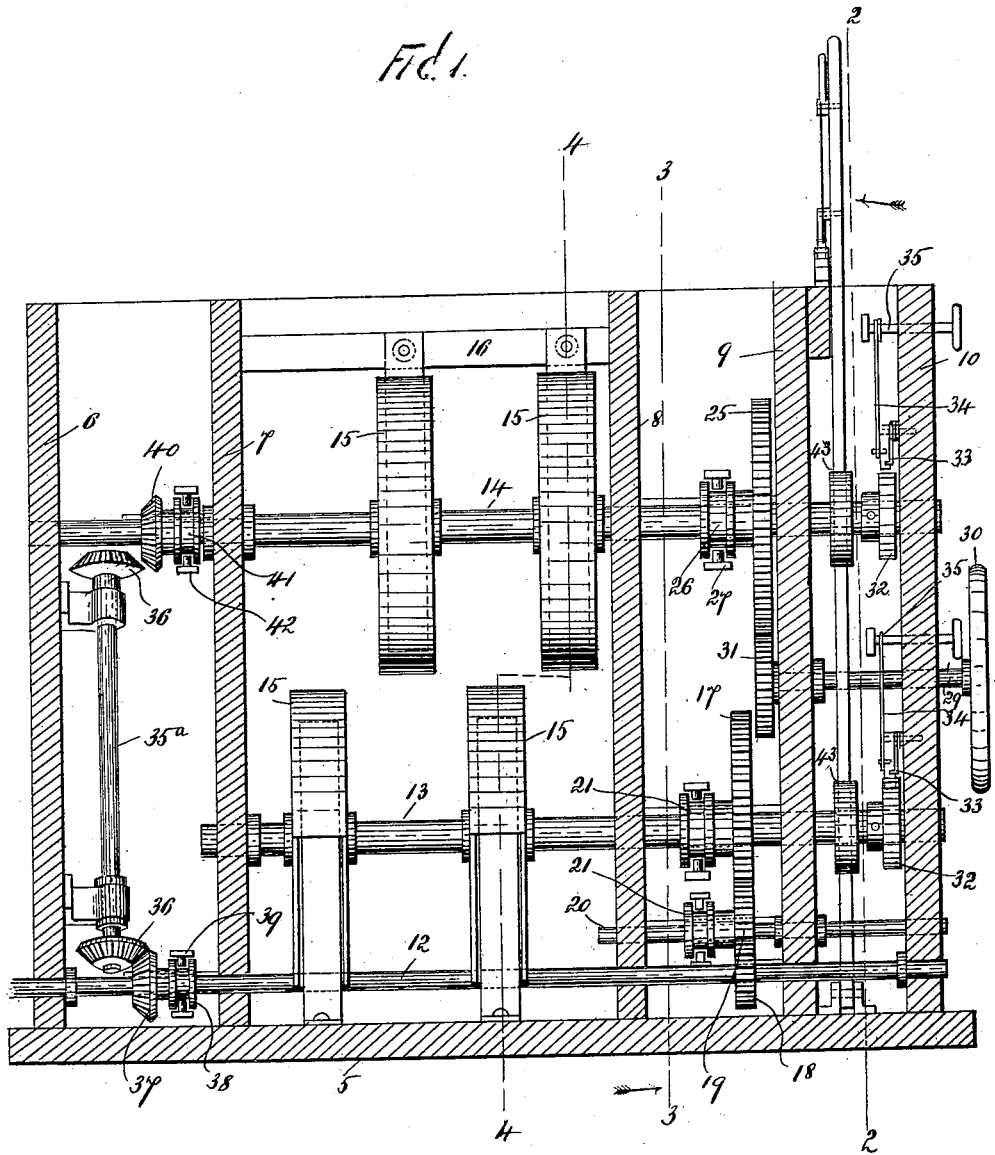

No. 626,844.

E. R. ROGERS & J. F. CUSHMAN.
POWER MECHANISM.
(Application filed Aug. 24, 1898.)

Patented June 13, 1899.

(No Model.)

4 Sheets—Sheet 1.

WITNESSES
John Buckler,
A. C. McLoughlin

INVENTORS
Ernest R. Rogers
John F. Cushman, and
BY
Edgar Tate
ATTORNEYS

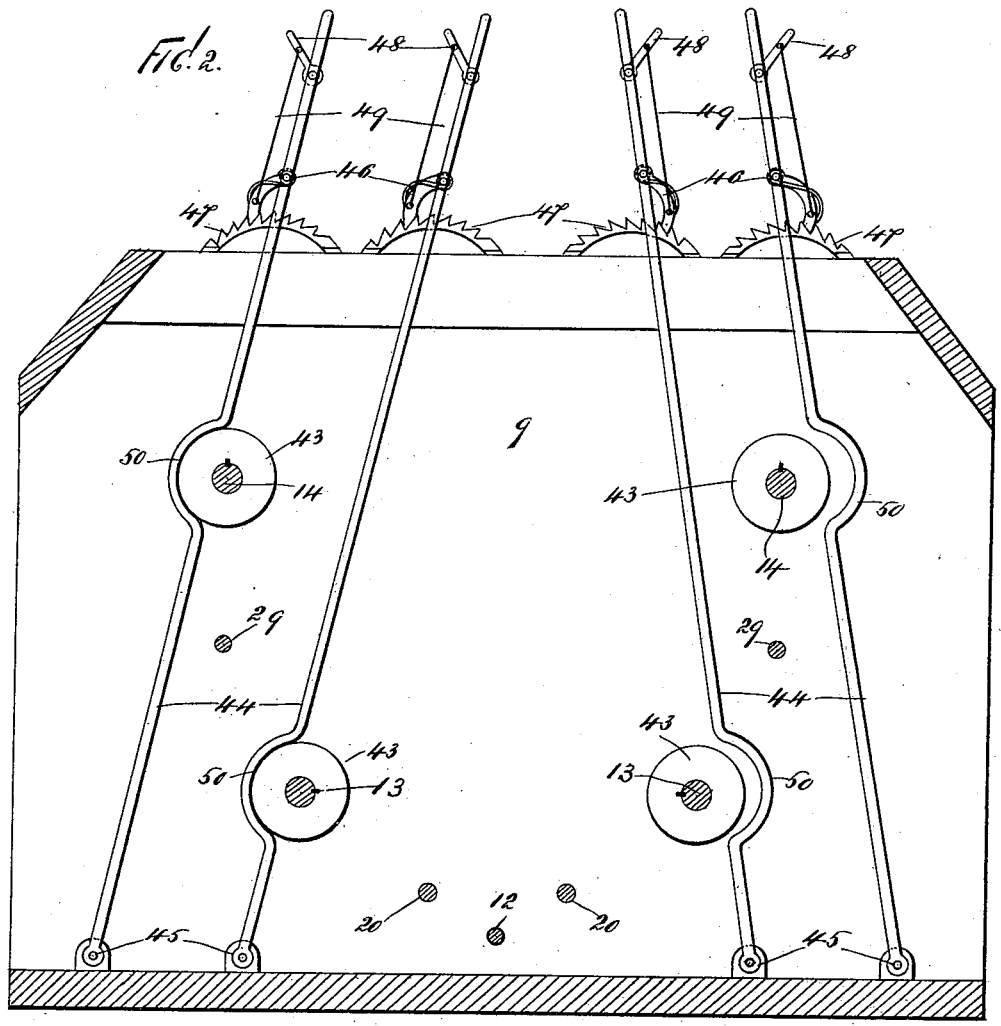

No. 626,844. Patented June 13, 1899.
E. R. ROGERS & J. F. CUSHMAN.
POWER MECHANISM.
(Application filed Aug. 24, 1898.)
(No Model.) 4 Sheets—Sheet 3.
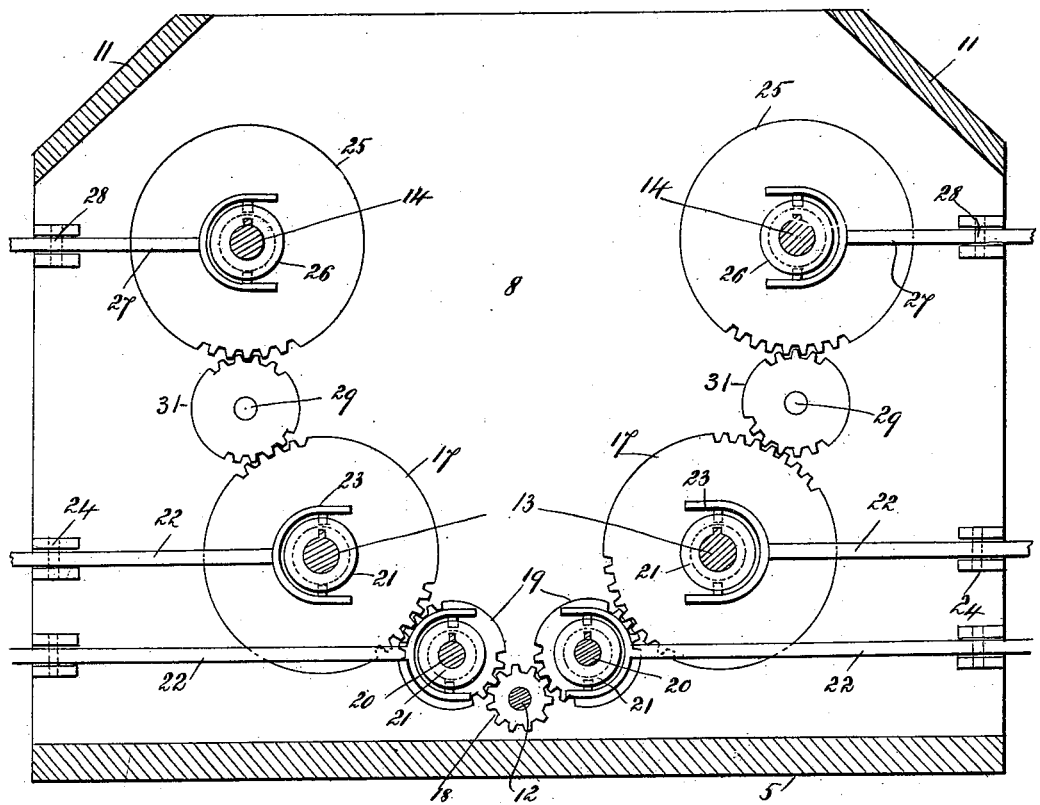
WITNESSES
INVENTORS
ATTORNEYS No. 626,844. Patented June 13, 1899.
E. R. ROGERS & J. F. CUSHMAN.
POWER MECHANISM.
(Application filed Aug. 24, 1898.)
(No Model.) 4 Sheets—Sheet 4.
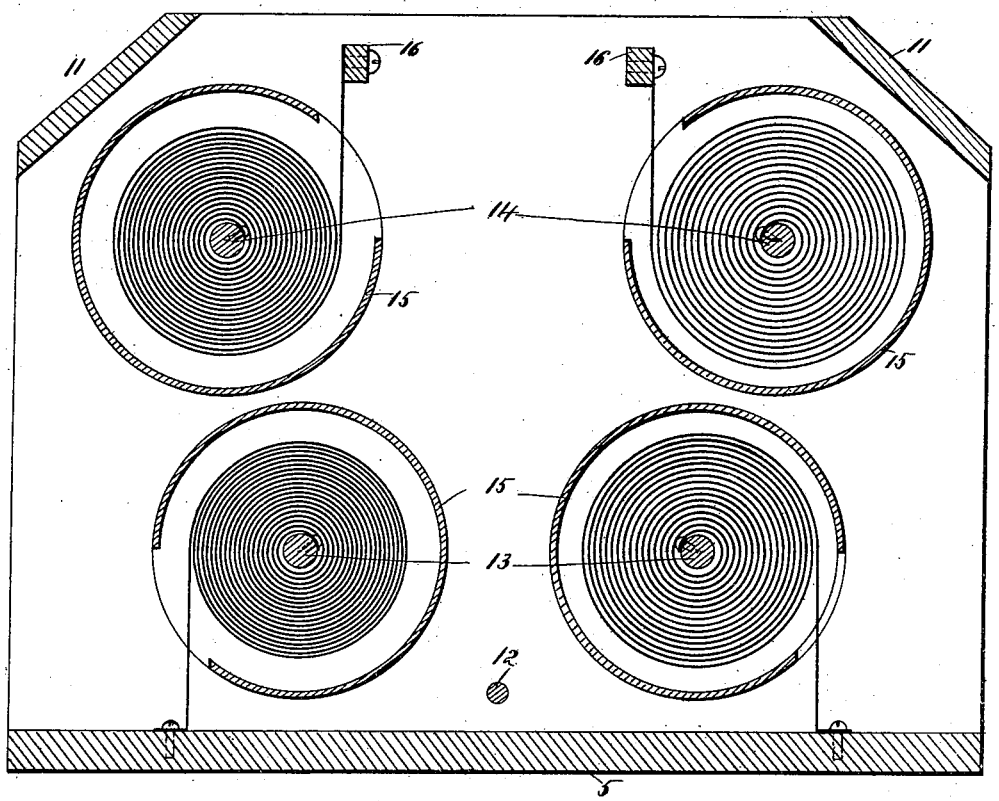
WITNESSES
INVENTORS
Ernest R. Rogers
John F. Cushman and
BY
Edgar Tate
ATTORNEYS.

UNITED STATES PATENT OFFICE.

ERNEST R. ROGERS AND JOHN FREDERICK CUSHMAN, OF MYSTIC, CONNECTICUT.

POWER MECHANISM.

SPECIFICATION forming part of Letters Patent No. 626,844, dated June 13, 1899.

Application filed August 24, 1898. Serial No. 689,383. (No model.)

*To all whom it may concern:*

Be it known that we, ERNEST R. ROGERS and JOHN FREDERICK CUSHMAN, citizens of the United States, residing at Mystic, in the county of New London and State of Connecticut, have invented certain new and useful Improvements in Power Mechanism, of which the following is a full and complete specification, such as will enable those skilled in the art to which it appertains to make and use the same.

This invention relates to spring power mechanism for propelling vessels; and the object thereof is to provide an improved device of this class which is simple in construction and operation and which comprises a propeller-shaft and two separate sets of power devices geared in connection therewith, one of which is adapted to propel a shaft in one direction and the other in the opposite direction; and with this and other objects in view the invention consists in the construction, combination, and arrangement of parts hereinafter described and claimed.

The invention is fully disclosed in the following specification, of which the accompanying drawings form a part, in which the separate parts of our improvement are designated by the same numerals of reference in each of the views, and in which—

Figure 1 is a central longitudinal section of the mechanism which we employ; Fig. 2, a vertical section on the line 2 2 of Fig. 1; Fig. 3, a vertical section on the line 3 3 of Fig. 1, and Fig. 4 a similar section on the line 4 4 of Fig. 1.

In the practice of our invention we provide a suitable framework or support, which is placed longitudinally of the vessel and which comprises a bottom 5 and a plurality of vertical partitions or stays 6, 7, 8, 9, and 10, and these partitions or stays are preferably rectangular in form and are connected at their upper corners by longitudinal braces 11. The said framework or support, however, may be constructed in any desired manner, and in practice the propeller-shaft 12 is mounted centrally of the bottom thereof, and at each side of said propeller-shaft and at a predetermined distance above the same is mounted a power-shaft 13, and at a predetermined distance above each of the power-shafts 13 is mounted a supplemental power-shaft 14, and each of said power-shafts and supplemental power-shafts is provided with a spring-drum 15, and the springs of the drum 15 on the power-shafts 13 are connected with the bottom of the frame or support, as shown in Figs. 1 and 4, and with said shafts, while the springs of the drum 15 on the supplemental power-shafts are connected with longitudinal braces 16 and with said shafts, and the arrangement of these springs is such that they are wound up by turning the shafts with which they are connected on the opposite side of the propeller-shaft in opposite directions.

Each of the shafts 13 is provided with a large gear-wheel 17, which is geared in connection with a pinion 18 on the propeller-shaft by means of an intermediate pinion 19, and these pinions 19 are mounted on a shaft 20, on which they are free to slide, and the wheels 17 and the pinions 19 are each provided with a grooved wheel or hub 21, and said wheels and said pinions are moved longitudinally of the shafts on which they are mounted by means of levers 22, which are provided at their inner ends with yokes 23, which are connected with said grooved collars or hubs in the usual manner and which are pivotally supported at 24, and by means of this construction the power-shafts on either side of the frame or support may be thrown into or out of gear with the propeller-shaft whenever desired. The supplemental shafts 14 are also each provided with a gear-wheel 25, having a grooved hub or collar 26, and said wheels are free to slide on the shafts on which they are mounted and are moved longitudinally of said shafts by levers 27, which are connected with said hubs or collars and which are pivotally supported at 28, and below each of the supplemental shafts is mounted a winding-shaft 29, and these shafts pass through the end of the casing or support and are provided at their outer ends with a wheel or handle 30 and on their inner ends with a pinion 31, and the wheels 25 on the supplemental power-shafts are adapted to be thrown into connection with the pinion 31, as are also the wheels 17 on the power-shafts 13, and this construction constitutes the winding mechanism of all of the spring-drums, it being understood that the spring-drums on one side are wound by one of the shafts 29, while the spring-drums on the other side of the frame or support are wound by the other shaft 29.

Each of the shafts 13 and 14, on which the spring-drums are wound, is provided with a ratchet 32 and a spring-operated pawl 33, which operates in connection therewith, and in the winding of said shaft, as above described, or the springs mounted thereon the said pawls bear upon said ratchets and prevent the rotation of said shafts in the wrong direction, and connected with each of said pawls is a cord 34, which is wound on a bolt 35, which projects through the end of the frame or support and which is adapted to be turned so as to raise said pawls, it being understood that said pawls are raised out of contact with said ratchets when the mechanism is in operation, so as to permit the power-shafts 13 and the supplemental power-shafts 14 to revolve.

The supplemental power-shafts are geared in connection with the propeller-shaft by means of shafts 35ª, provided at each end with a pinion 36, and the pinions 36 at the lower ends of the shafts 35 operate in connection with the pinion 37 on the propeller-shaft 12, and the pinion 37 is provided with a grooved collar or hub 38, and said pinion is adapted to be moved longitudinally of the shaft 12 and is operated by a lever 39 exactly similar to the levers 22 and 27. The pinions 36 at the upper ends of the shafts 35ª operate in connection with corresponding pinions 40, one of which is mounted on each of the shafts 14 and adapted to slide thereon, and the pinions 40 are provided with grooved collars or hubs 41 and are also operated by levers 42 similar to the levers 22 and 27.

From the foregoing it will be seen that the shafts 13 and 14 on either side of the frame or support may be thrown into gear with the propeller-shaft whenever desired; but said shafts on either side of the frame or support cannot both be thrown into gear with the propeller-shaft at the same time, and by means of this construction the propeller may be turned in opposite directions, as will be readily understood, and when turned in either direction the said propeller or the propeller-shaft is operated by means of one of the shafts 13 and one of the shafts 14, said shafts being arranged both on the same side of a vertical plane extending through the propeller-shaft.

I also provide brakes for each of the shafts 13 and 14, and these brakes consist of friction-wheels 43, which are rigidly secured to said shafts, and brake-levers 44, pivotally supported at 45 and projecting upwardly through the main frame or support and provided near their upper ends with pivoted spring-operated pawls 46, which operate in connection with curved rack-bars 47, secured to the top of one of the partitions or stays 9, and said pivoted pawls are operated by short levers 48, pivotally connected with the upper ends of said brake-levers and connected with said pawls by cords or rods 49. The brake-levers 44 are provided with segmental or curved portions 50, which are adapted to bear on the friction-wheels 43, and by means of this arrangement the brakes may be applied to the power-shafts 13 and the supplemental power-shafts 14 whenever desired.

Our improvement is simple in construction and operation and is perfectly adapted to accomplish the result for which it is intended and may be applied for other and similar purposes.

Having fully described our invention, we claim as new and desire to secure by Letters Patent—

1. The herein-described power apparatus for propelling vessels, comprising a suitable frame, a propeller-shaft mounted therein, a power-shaft mounted therein above and at either side of said propeller-shaft, a supplemental power-shaft mounted therein above each of said power-shafts, each of said power-shafts and said supplemental power-shaft being provided with a plurality of spring-drums, each connected with said frame and with the respective shaft, said spring-drums being adapted to rotate the pair of shafts on each side of said propeller-shaft in relatively opposite directions, adjustable devices for operatively connecting simultaneously the shafts on either side of said propeller-shaft with said propeller-shaft, and a winding device for the drums of each of said pairs of similarly-rotating shafts and comprising a short shaft journaled in said frame and provided at one end with an operating-wheel and with a gear-wheel, and a slidably-mounted gear-wheel mounted upon each of said lower and supplemental shafts and with which the said gear-wheel of the respective winding device is adapted to operatively engage, substantially as shown and described.

2. The herein-described power apparatus for propelling vessels, comprising a suitable frame, a propeller-shaft mounted therein, a power-shaft mounted therein above and at either side of said propeller-shaft, a supplemental power-shaft mounted therein above each of said power-shafts, each of said power-shafts and said supplemental power-shafts being provided with a plurality of spring-drums, each connected with said frame and with the respective shaft, said spring-drums being adapted to rotate the pair of shafts on each side of said propeller-shaft in relatively opposite directions, adjustable devices for operatively connecting simultaneously the shafts on either side of said propeller-shaft, each of said supplemental power-shafts being adapted to be operatively connected with said propeller-shaft by means of a connecting-shaft journaled in said frame and provided at each end with a bevel-gear, a bevel-gear slidably mounted upon said propeller-shaft and a bevel-gear slidably mounted upon said supplemental power-shaft, said bevel-gears being adapted to operate connectively, and a winding device for the drums of each of said pairs of similarly-rotating shafts and comprising a short shaft journaled in said frame and provided at one end with an operating-wheel and with a gear-wheel, and a slidably-mounted gear-wheel mounted upon each of said lower and supplemental shafts and with which the said gear-wheel of the respective winding devices engages, substantially as shown and described.

3. The herein-described power apparatus for propelling vessels, comprising a suitable frame, a propeller-shaft mounted therein, a power-shaft mounted therein above and at either side of said propeller-shaft, a supplemental power-shaft mounted therein above each of said power-shafts, each of said power-shafts and said supplemental power-shafts being provided with a plurality of spring-drums, each connected with said frame and with the respective shaft, said spring-drums being adapted to rotate the pair of shafts on each side of said propeller-shaft in relatively opposite directions, adjustable devices for operatively connecting simultaneously the shafts on either side of said propeller-shaft with said propeller-shaft, and a brake device for each of said power-shafts and supplemental power-shafts, comprising a brake-rod pivoted in the frame and provided with a brake-shoe, a friction-wheel secured to each of said power and supplemental power shafts, and in connection with which said brake-shoes are adapted to operate and devices for locking and unlocking said brake-rods, substantially as shown and described.

In testimony that we claim the foregoing as our invention we have signed our names, in presence of the subscribing witnesses, this 6th day of August, 1898.

ERNEST R. ROGERS.
JOHN FREDERICK CUSHMAN.

Witnesses:
JOHN T. BATTY,
THOMAS A. PAYNE.